July 21, 1959
F. S. SCHRAGE
2,895,279
SECTIONAL VEHICLE
Filed Nov. 10, 1955
6 Sheets-Sheet 2
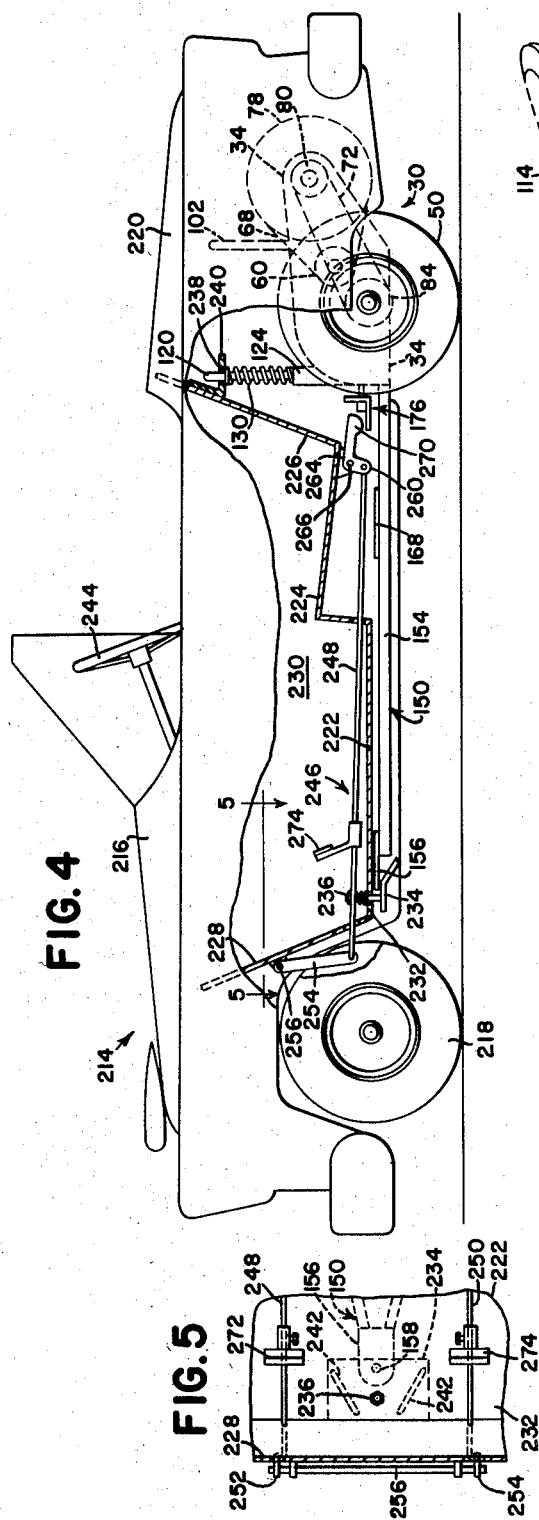
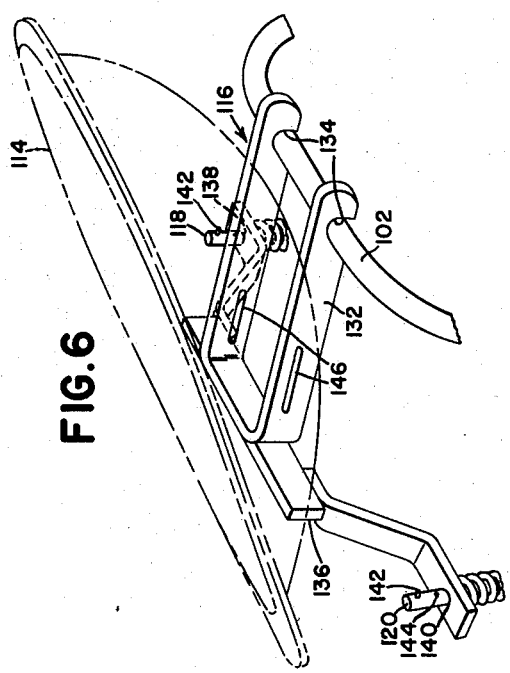
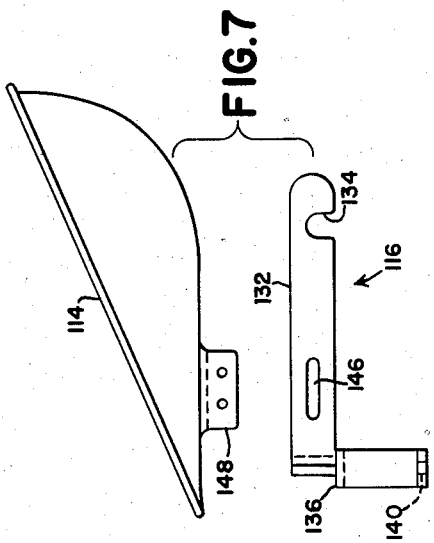
INVENTOR.
F. S. SCHRAGE
BY
ATTORNEY July 21, 1959     F. S. SCHRAGE     2,895,279
SECTIONAL VEHICLE
Filed Nov. 10, 1955     6 Sheets-Sheet 3
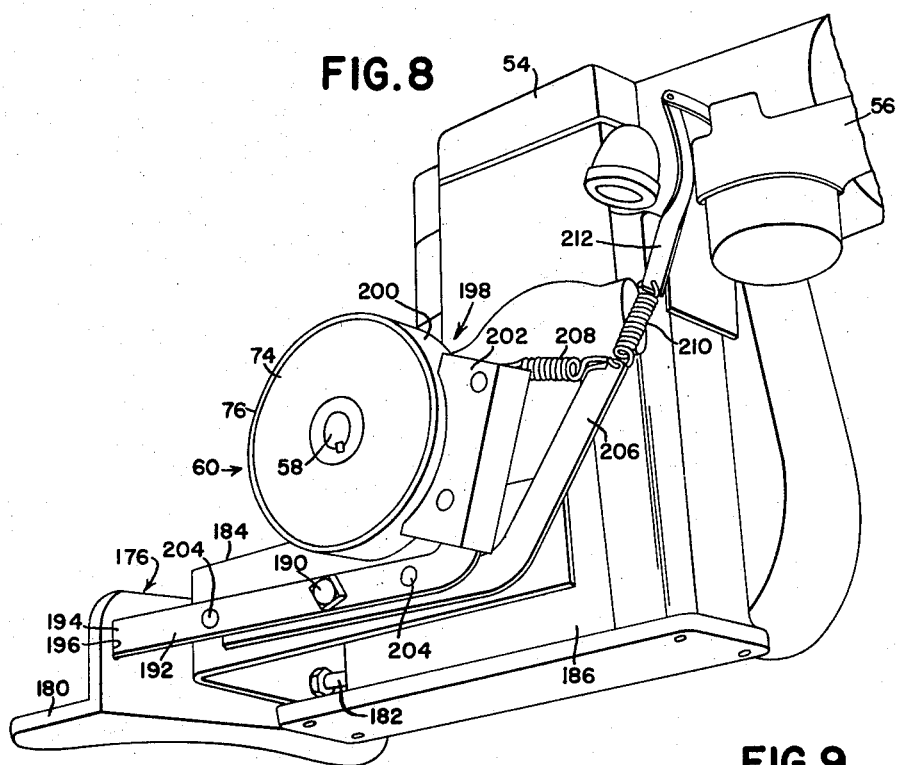
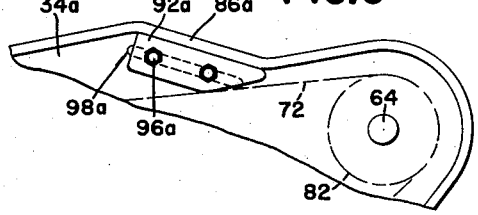
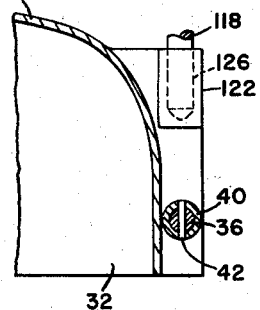
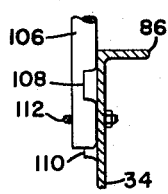
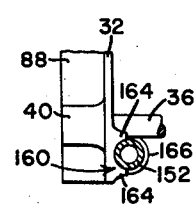
INVENTOR.
F. S. SCHRAGE
ATTORNEY

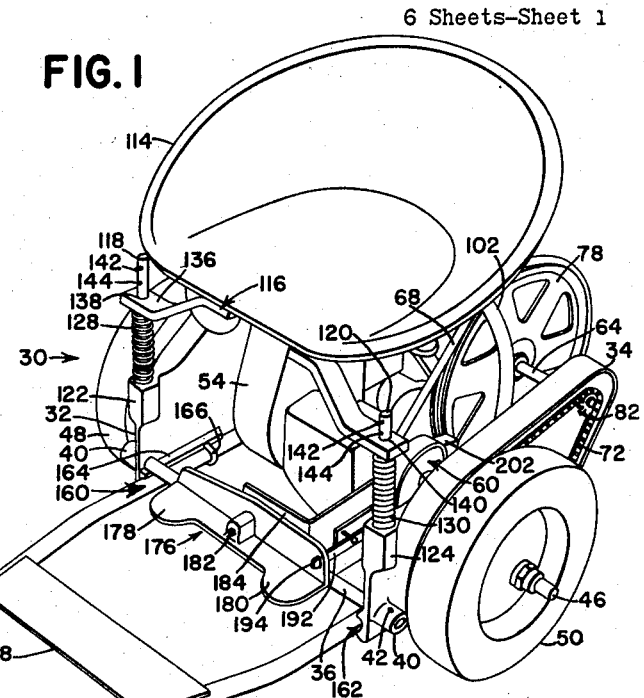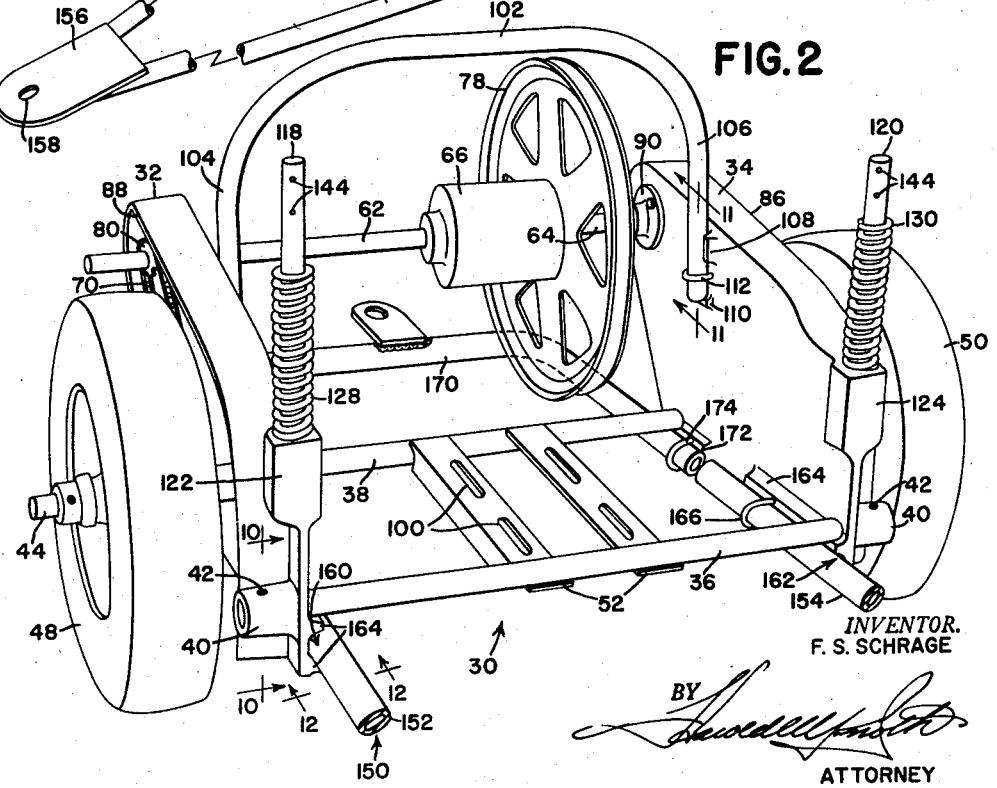

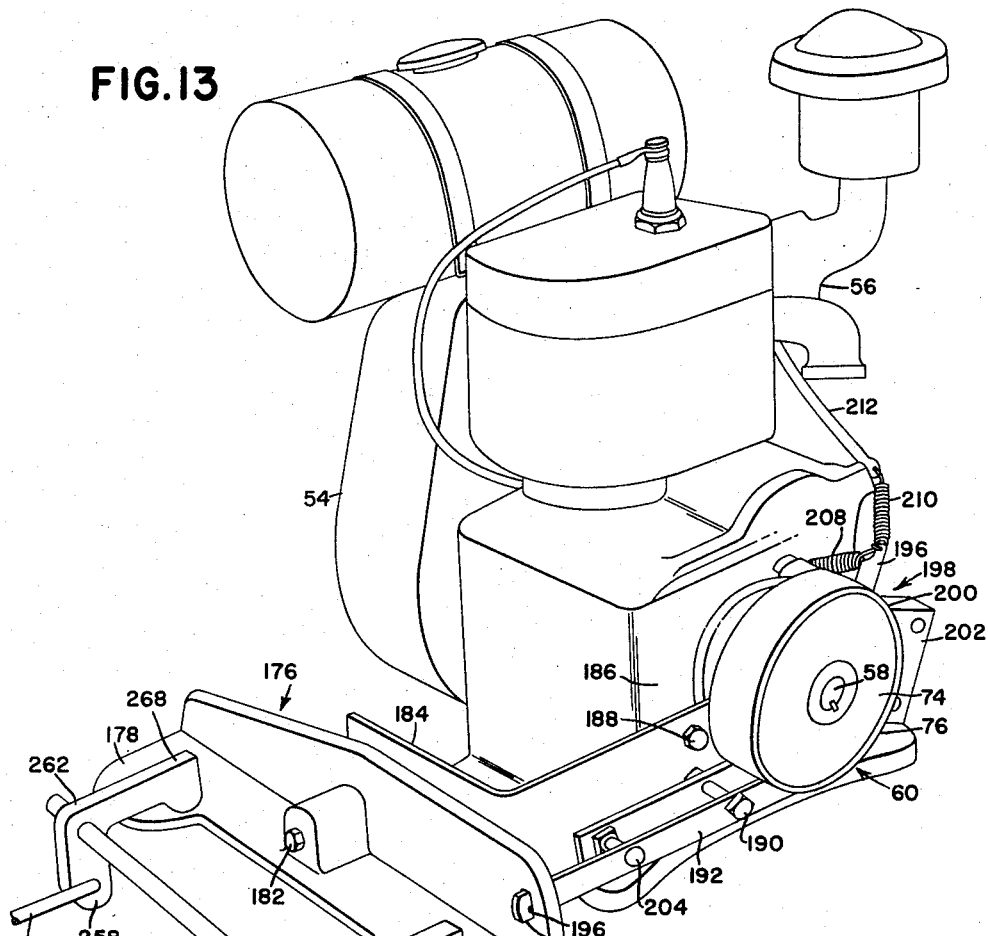

July 21, 1959  F. S. SCHRAGE  2,895,279
SECTIONAL VEHICLE
Filed Nov. 10, 1955  6 Sheets-Sheet 5
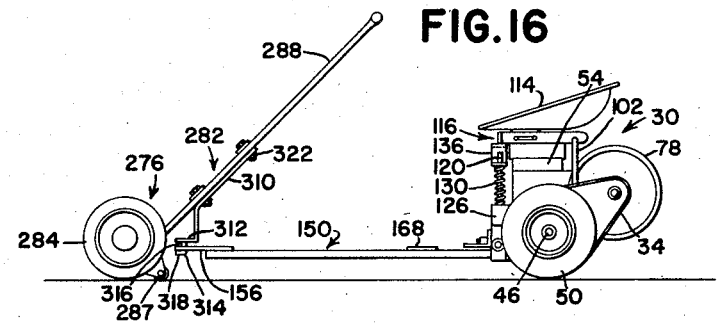
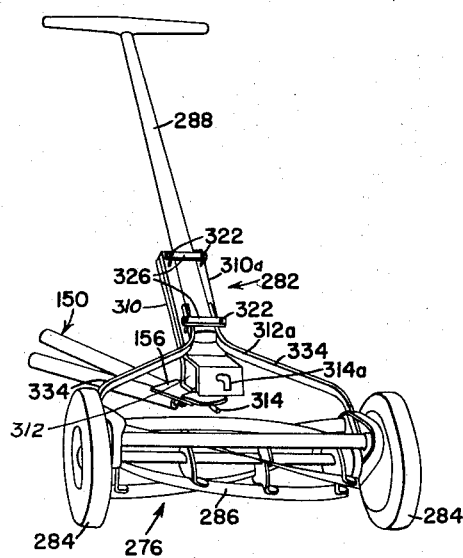
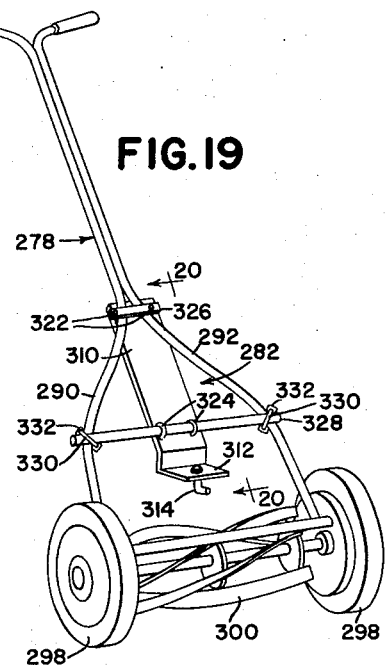
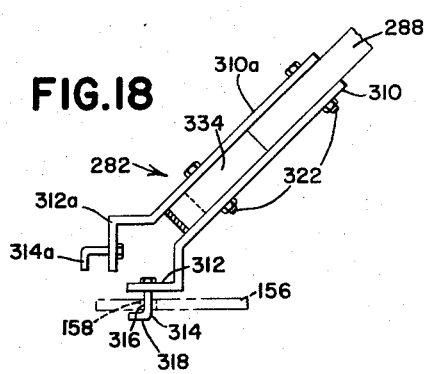
INVENTOR.
F. S. SCHRAGE
BY
ATTORNEY July 21, 1959 F. S. SCHRAGE 2,895,279
SECTIONAL VEHICLE
Filed Nov. 10, 1955 6 Sheets-Sheet 6
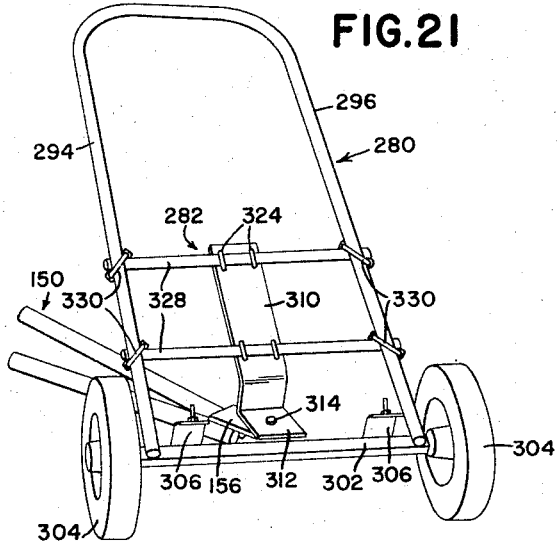
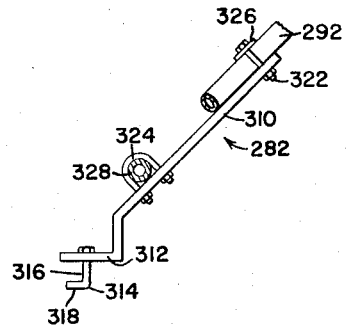
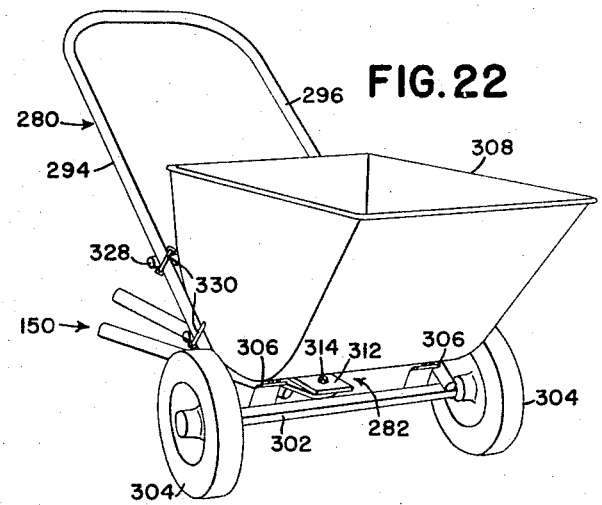
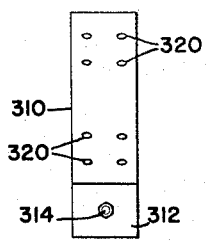
INVENTOR.
F. S. SCHRAGE
BY
ATTORNEY United States Patent Office 2,895,279
Patented July 21, 1959

2,895,279
SECTIONAL VEHICLE

Frederick S. Schrage, Rock Island, Ill., assignor to
G. D. Shawver, Davenport, Iowa Application November 10, 1955, Serial No. 546,045

8 Claims. (Cl. 56—26)

This invention relates to a vehicle made up of selectively interconnectible and separable mobile units, one of which is powered, and more particularly to a novel power unit and its relationship to and use with a wide variety of utility or auxiliary mobile units such as, but not limited to, small-scale motor cars, lawn mowers, utility carts, seeders, lawn sweepers, snow plows and such other implements as are found useful for pleasure or in maintenance, gardening etc. about residences, estates, recreational areas and the like.

One of the principal objects of the invention is the provision of a novel and improved power unit of the unstable type which obtains stability from attachment to and partial support on an auxiliary unit of the character mentioned above. Still another object resides in furnishing an auxiliary unit in the form of a small-scale motor car, the power unit affording not only the motive power and rear wheels of such car but also part of the frame structure. A principal feature of the invention is the control means for the power unit and the universal adaptability thereof to any auxiliary unit used therewith, particularly in the case of the motor car version, wherein control components basic to the car are detachably cooperative with those of the power unit.

Further features and objects embrace the provision of means for facilitating the connection and disconnection of the power and auxiliary units; detachable means enabling interchange of a variety of auxiliary units with the power units; novel means for sustaining the units in interrelated manner so that they mutually support and stabilize each other; novel and simple speed-regulating and brake means; improved seat structure on the power unit; economical frame or main support design; simple and convenient driving mechanism; adjustment of the several basic parts so as to accommodate operators of different stature; and such other features and novel characteristics as will appear as the invention is disclosed in detail, by way of example, in the ensuing specification and drawings, the several figures of which are described immediately below.

Figure 1 is a perspective of the mobile power unit.

Figure 2 is an enlarged perspective of the power unit with the seat and power plant removed.

Figure 3 is an enlarged view, partly in section, of the drive clutch.

Figure 4 is a side view, partly in section, showing a vehicle made up of the power unit and a small-scale motor car.

Figure 5 is a fragmentary section as seen along the line 5—5 of Figure 4.

Figure 6 is a perspective of the seat support, with the seat shown in phantom.

Figure 7 is a side view of the seat and seat support in displaced relation.

Figure 8 is a perspective of the power plant, looking forwardly and to the right.

Figure 9 is a fragmentary view of one form of drive chain tensioning means.

Figure 10 is an enlarged fragmentary section as seen along the line 10—10 of Figure 2.

Figure 11 is a section on the line 11—11 of Figure 2.

Figure 12 is a section on the line 12—12 of Figure 2.

Figure 13 is a perspective of the power plant, looking rearwardly and to the right.

Figure 14 is a fragmentary view of another form of drive tensioning means.

Figure 15 illustrates connection and separation of the structure of Figure 4.

Figure 16 shows the power unit with a mower.

Figure 17 is a front perspective of one form of mower as connected to the reach means of the power unit.

Figure 18 is an enlarged view showing a double bracket arrangement.

Figure 19 illustrates another arrangement of the bracket means on another form of mower.

Figure 20 is a side view, partly in section, as seen along the line 20—20 of Figure 19.

Figure 21 is a perspective showing the bracket structure in use for connecting the power unit to a further type of front or propelled unit.

Figure 22 shows an addition to the structure of Figure 21.

Figure 23 is a plan of part of the bracket means.

It should be mentioned at the outset that such expressions as front, rear, top, bottom, etc. are purely relative and are used here and in the appended claims only in the interests of clarity and brevity, for it is clear that the parts and components could be reversed and otherwise rearranged once the basic principles here disclosed are comprehended. The expressions right and left are used relative to the position of an observer standing behind the machine and looking forwardly.

The rear or power unit is indicated as a whole by the numeral 30 and is shown as having a base or main frame made up of right and left hand fore-and-aft side members 32 and 34, each preferably in the form of a lightweight casting providing a wall, rigidly cross-connected in transversely spaced apart relationship by front and rear cross members or bars 36 and 38, respectively. Each side member casting is appropriately drilled to receive the proximate ends of the associated rods or bars 36 and 38, a typical assembly being illustrated in Figure 10, wherein alined bosses 40 on the castings 32 and 34 are drilled and secured to the ends of the bar 36 by retaining means or pins 42.

The base support carries, intermediate its front and rear ends, transverse axle means here comprising right and left hand coaxial stub axles 44 and 46, respectively, each rigidly secured to its casting or side member as by a construction similar to that shown and described relative to the cross bars 36 and 38; although, any other construction could be adapted at some sacrifice of design simplicity and economy. The axles respectively journal wheels 48 and 50, here of the semi-pneumatic-tired type as a matter of preference for obvious reasons. Wheel or ground-engaging means of other types are not excluded, however, as devices for rendering the unit mobile. An overall idea of the size of the unit and associated components may be obtained from the fact that in the instant case the outer diameter of the wheels is approximately twelve inches.

It has been found from practical use of the power unit 30 that the framework 32—34—36—38 possesses strength far beyond that required in normal use; yet, the structure is extremely light in weight and inexpensive to manufacture and assemble. Further features of strength and simplicity are achieved by the use of an engine mount of fore-and-aft horizontal angle bars 52 rigidly joined as by welding at their front and rear ends respectively to the front and rear cross bars 36 and 38. There is a vertical offset between the bars 36 and 38 and accordingly the mount is made level by welding its rear ends to the top of the bar 38 and its front ends to the bottom of the other bar 36. The mount supports or carries a power plant 54, here an internal combustion engine of any well-known one-cylinder type which is provided with a conventional carburetor 56 or equivalent device by means of which the speed of a motor-driven output shaft 58 may be regulated in the driving of the wheels 48 and 50 through drive mechanism including a clutch 60, intermediate cross-shaft means having right and left coaxial shafts 62 and 64 interconnected by a suitable differential means 66, a primary drive belt 68 and right and left hand drive chains 70 and 72. The belt and chains could of course be replaced by any equivalent endless drive means. The differential contains typical gearing for achieving obvious results and therefore elaboration is deemed unnecessary.

The clutch 60 is preferably of the centrifugal overrunning type, having a driving part 74 keyed to the output shaft 58 and a coaxial driven part 76, the latter being a sheave in alinement with a large sheave 78 fixed to the differential casing for receiving the belt 68. The clutch 60 operates on the well-known principle of automatic engagement when the speed of the output shaft 58 attains and exceeds a predetermined value, disengagement being automatically effected when the output shaft speed falls below that value, as when the engine 54 is idling. Also, the driven part 76 will overrun the driving part 74 when the engine is idling or cut off so that the unit may be manually maneuvered without oppositon from the engine.

The differential shafts 62 and 64 project laterally outwardly at the outer faces of the respective side members 32 and 34 and have respectively keyed thereto driving sprockets 80 and 82. Each sprocket is connected by its drive chain 70, 72 to a wheel sprocket, as 84 (Figure 4), fixed to the respective ground wheel, as 50. The casting or side member 34 is marginally flanged at 86 which effects recessing of the outer face of the casting 34 so as to protectively house and serve as a chain guard for the drive chain 72. The other side casting is symmetrically constructed and is characterized as above, a portion of the marginal flange of which is visible at 88. In the arrangement shown in Figure 14, the left hand differential shaft 64 is journaled in a flanged bearing 90 having a hub 92 loosely encircled by an opening 94 in the wall portion of the casting 34 and normally tightly secured in place by bolts 96 passed through the bearing flange and through slots 98 in the casting 34. Thus, the bolts 96 may be loosened and the position of the bearing changed, as for tensioning the chain, etc. or for securing proper alinement with a similarly mounted right hand bearing (not shown). The motor mount bars 52 are slotted at 100 to permit positioning of the engine 54 to secure proper tension in the belt 68.

A modified form of chain-tensioning means is shown in Figure 9, wherein a side casting 34a, similar to the casting 34, has a portion 86a of its flange angularly related to the upper run of the drive chain 72 and adjustably mounting a block 92a, preferably of hard wood, for movement toward or away from the chain run. A slot 98a accommodates bolts 96a for the purpose of accomplishing adjustment. The block 92a is backed up at all times by the flange portion 86a and the load is thus removed from the bolts 96a.

An arch 102 spans and cross-connects the side castings 32 and 34, having right and left hand legs 104 and 106 respectively mounting on the castings as by socket means formed by cooperating spaced apart upright lugs 108 (Figs. 2 and 11) and a horizontal stop lug 110, together with releasable means such as a U-bolt 112 for each leg. The arch or bail 102 bridges the power plant and has many functions: It adds to the transverse strength of the base support; it serves as a handle for lifting the power unit; and it comprises part of support means for a seat 114 and seat-supporting structure 116, which are best shown in Figures 1, 6 and 7.

The novel structure involved in supporting the seat, which serves also as part of means for interconnecting the power unit and a front unit, as will be hereinafter described, includes a pair of transversely spaced apart uprights 118 and 120 carried respectively by and rising from front bosses 122 and 124 on the side castings 32 and 34. Figure 10 shows typical structure, portraying the boss 122 as being drilled at 126 to receive the lower end of the upright 118, preferably in a force fit. Yieldable members or coiled springs 128 and 130, loosely received respectively by the uprights, serve as resilient limit means for cushioning and sustaining the forepart of the seat support 116, the springs abutting the tops of the respective bosses 122 and 124.

As best shown in Figure 6, the seat support means 116 comprises a fore-and-aft U-shaped element 132 having its legs notched at the rear at 134 to receive the arch 102 and secured as by welding at its front end to a cross member assembly 136 which has opposite ends vertically apertured at 138 and 140 so as to respectively receive the free upper ends of the uprights 118 and 120. The seat is thus locked against fore-and-aft and lateral displacement yet may have cushioned up and down movement. Accidental upward separation of the seat and support may be prevented by pins 142 removably inserted diametrically through the upper ends of the uprights, pin-receiving apertures 144 being therein provided. The legs of the U-shaped part 132 have fore-and-aft slots 146 for cooperation, by suitable fasteners not shown, with an apertured lug or ear 148 depending from the seat 114 (Figure 7).

The power unit has a forwardly extending frame part or reach means 150, made up of right and left hand bars or tubular members 152 and 154, which converge to and are rigidly interconnected by a front end portion or plate 156 having a vertical aperture or eye 158 therein. The side castings mount the rear ends of the reach members 152 and 154 via forwardly facing right and left hand socket means 160 and 162, of which the details as shown in Figure 12 are typical. Each socket means is made up of vertically spaced horizontal lugs 164 in which the rear end of the respective reach member is received. Releasable means, here a U-bolt 166, secures the reach in place but permits fore-and-aft adjustment when desired. A cross plate 168 rigidly interconnects the reach bars 152 and 154 just ahead of the seat 114 and affords a platform for a seated or standing operator as well as increasing the strength of the reach.

A drawbar 170, supported by the side castings 32 and 34 by socket means 172 and U-bolts 174 (one of each visible in Figure 2), similar to those at 160 and 162, furnishes means for towing auxiliary units or implements. The drawbar and reach can be interchanged from front to rear if desired.

Regardless of which auxiliary unit is associated with the power unit, the latter is controlled by a transverse, unitary, bi-directionally movable control element 176 which has right and left hand ends or pedal portions 178 and 180, respectively, and which is fulcrumed intermediate its ends on a fore-and-aft axis on the power unit by means of a pivot or fulcrum 182 forming part of an L-shaped bracket 184. Engines of the type shown customarily have mounting pads thereon, such as the surface 186, provided with tapped bores, which in this case receive upper and lower cap screws 188 and 190 for mounting the fore-and-aft leg of the bracket 184, the transverse leg of which carries the pivot or fulcrum 182.

The lower, and longer, cap screw or bolt 190, affords a transverse pivot for a fore-and-aft lever 192, one end 194 of which extends operatively through a slot 196 in the transverse lever provided by the controller 176, and the other end of which is operative to control the speed-regulating device or carburetor 56 as well as brake means 198 for the power unit. The brake means comprises a brake drum 200 integral with the sheave 76 of the clutch 60 and a brake shoe or block 202 mounted on the rear end of the lever 194. The lever 192 is made up of two side-by-side members rigidly interconnected by cross pins 204 but for present purposes can be considered a single element, since any equivalent structure will perform as required. Suffice it to say that the lever 192 has a rearward and upward integral extension 206 biased forwardly by a coiled brake-return spring 208, which is suitably anchored to the engine and which serves to press the brake shoe 202 against the drum 200, thus biasing the brake means to braking or brake-on position. Hence, when the power unit and associated auxiliary are stopped with the engine idling or shut down, the clutch 60 is disengaged and since the brake drum is fast to the clutch sheave 76, which is drivingly connected to the wheels 48 and 50, the braking action is on the wheels. The brake is released or moved to brake-off position by depression of the right hand pedal part 178 of the controller 176, which an operator seated at 114 can readily accomplish with his right heel while his toe rests on the platform 168. Such rocking of the controller lifts the left hand end thereof and also raises the forward end of the lever 192, rocking this lever clockwise as viewed in Figures 8 and 13 to move the brake shoe away from the drum. Release of manual pressure on the pedal 178 enables the spring 208 to automatically brake the unit.

A feature of the controller is that it also controls the carburetor 56 via a connection, including a spring 210, to a throttle lever 212. The spring 210 is required in the instant installation because the engine 54 is governed and the spring 210 must collaborate with the governor spring (not shown) as is conventional. Variations in control connections to acccommodate other engines or motors and speed-regulating devices will readily suggest themselves. In any event, the arrangement here is such that speed-increase or throttle opening is incurred simultaneously with release of the brake 198, and vice versa. Hence, depression of the right hand pedal 178 of the controller 176 releases the brake 198 and opens the throttle through a relatively wide range, for example here enabling a full range of speeds between zero and seven to eight m.p.h. At low speeds, braking action under tension of the spring 208 will in most cases be sufficient, so that the operator need but remove his heel from the pedal 178 to incur closed throttle and application of the brake. However, if increased braking action is desired, the operator, may with his left heel, depress the other pedal 180. The linkage effected by the spring 210 and throttle lever 212 permits the necessary lost motion.

Another feature of the brake arrangement is that brake action is substantially diametrically opposed to the load imposed by the tension of the belt 68 on the bearings for the output shaft as well as internal bearings in the clutch 60. That is to say, when the unit is idle, the pull of the belt on the clutch 60 is upwardly and to the rear, whereas the pressure of the brake shoe 202 as afforded by the brake return spring 208 is forwardly and downwardly.

From the description thus far and as exemplified in Figure 1, the power unit 30 is a self-contained but unstable unit having a removable seat and its own controls. Therefore, it may be used with any of a large variety of auxiliary units, to furnish power for such units and to cooperate with frame parts thereof to afford a complete, stable, sectional vehicle. In most cases, the operator rides the seat 114 or platform and steers the vehicle by means including an articulate connection, including the reach eye 158, with the second or front unit, all which will be generally apparent but which will be developed in detail below. Regardless of the general instability of the power unit alone, it is substantially balanced about its wheels so that the reach may be easily lifted and lowered in effecting connection and disconnection with the other units. For the present, the description will pertain to the use of the power unit 30 with a small-scale motor car, the several aspects of which best appear in Figures 4, 5, 13 and 15.

The car represents a front unit 214 and comprises a body 216 carried on wheels 218 which, because of the position of the car ahead of the power unit, are front wheel means, it being understood that here as well as in connection with other power-unit-propelled units, other ground-engaging means such as tracks, runners, etc. could be substituted.

The car body extends fore-and-aft to give the completed vehicle a substantial wheel base and has a rear body part 220 in superposed relation to the power unit 30. The general overall appearance of a modern motor car is duplicated, enhancing the attractiveness of the vehicle. The framework of the body is based largely on the structural strength of the sheet metal or the like of which it is constructed but the body nevertheless represents a frame part extending rearwardly from the front wheels 218, including also a floor 222, a seat 224, a seat back 226 and a toe board 228, all of which define a driver's compartment 230 isolated from the power unit 30 in the interests of safety, comfort etc. The rear body part or deck 220 is hollow and encloses the major portion of the power unit.

A forward portion of the frame part constituted by the floor 222, as at 232, comprises the upper part of a support or connector means that also includes a plate portion or element 234 connected to the floor portion 232 by a spring-loaded bolt or the like 236, the portions or elements 232 and 234 defining a rearwardly facing mouth for receiving the front end reach plate element 156 (Figure 4). The plate 234 inclines downwardly and to the rear to afford a ramp for facilitating connection of the units 30 and 214. As seen in Figure 15, the body 216 is lifted about the transverse pivot included in the front wheels and the reach 150 is guided into place so that the reach plate is received in the connector means 232—234. The body is lowered into place over the power unit 30, the seat 114 having been removed so that the free upper ends of the power unit supports or uprights 118 and 120 are respectively received in transversely spaced apertures (one visible at 238, Figs. 4 and 15) in a cross-member support 240 carried by the rear body part 220, preferably fixed to the rear of the seat back 226. The support thus rests on the yieldable members or springs 128 and 130 and the rear of the car is sustained in a cushioned manner. The connector means portions 232 and 234 afford sufficient lost motion with the reach plate 156 so that the connection 232—234—156 is articulate, including of course a transverse pivot axis about which the body part and reach move relatively as the units 30 and 214 are connected or separated and also during travel of the vehicle so that the benefits of the springs 128 and 130 are obtained. It will be understood that separation of the two units is accomplished by reversal of the connection procedure just described. The tolerances are such that connection and disconnection are readily accomplished, the holes 238 in the body part cross member 240 easily accepting the uprights 118 and 120. Moreover, once the connection is at least partly made at 232—234—156, the cross member 240 readily slips into place. V guides 242 may be secured to one or the other of the portions 232 or 234 to center the connection (Figure 5). Since the uprights 118 and 120 engage the cross member 240 at two spaced points, lateral stability is provided against relative unit movement about a vertical axis. The reach plate is sustained and confined by the portions 232 and 234 against vertical displacement relative to the floor 222; although, as previously stated, there is sufficient looseness in that connection to enable cushioned up and down movement of the rear part of the body, which is in the zone of the driver's compartment 230. Because the units 30 and 214 are virtually rigid against relative lateral movement, the wheels 218 are steerable and are controlled by a typical steering wheel 244, which details are not important here.

Of extreme novel significance is the interrelation of the controllable means on the power unit (brake 198 and carburetor 56) and the controlling means, designated generally as 246, in the car 214. This controlling means features automatic connection with and disconnection from the power unit controller 176 and yet remains part of the car unit 214. The achievement of this result flows from the use of two fore-and-aft control members or rods 248 and 250, disposed above the car floor 222, and suspended at their front ends respectively by links 252 and 254 depending from a transverse pivot shaft 256 and supported at their rear ends respectively by depending arms 258 and 260 of bell cranks 262 and 264, which bell cranks are rockably supported by a transverse pivot shaft 266 and respectively have rearwardly extending arms 268 and 270. The pivot shaft 256 is supported ahead of the toe board and the pivot shaft 266 is mounted beneath the seat 224, the tow board and front of the seat being suitably apertured to permit free movement of the rods as by right and left hand pedals 272 and 274, respectively, adjustably secured to the rods to accommodate drivers of different statures.

As best shown in Figure 13, the rear arms 268 and 270 of the bell cranks 262 and 264 respectively engage the controller pedal portions 178 and 180 from above. Hence, natural forward movement of the right hand control rod 248 by its pedal 272 rocks the bell crank 262 in a clockwise direction, rocking the controller 176 in a counter-clockwise direction (as seen from the front; Figure 13) to release the brake 198 and open the throttle in the carburetor 56. The brake return spring 208 is sufficient to return the controlling components to neutral when pressure on the pedal 272 is relaxed. Forward pressure on the pedal 274 increases the application of the braking action, working through clockwise rocking (Figure 13) of the controller 176. When the car unit is lifted for separation from the power unit, the bell cranks simply separate upwardly from the controller, without any removal of pins, bolts, etc. Once the body is lifted clear of the uprights 118 and 120 (Figure 15) it may be rolled forwardly relative to the power unit, thus freeing the reach plate at 232—234 and the power unit is ready for use with another unit, such as the lawn mower 276 of Figures 16, 17 and 18, the lawn mower unit 278 of Figures 19 and 20, or the wheeled unit 280 of Figures 21 and 22, each of which will be described below in terms of its connection to and separation from the power unit 30 by means of novel connector means or bracket structure 282.

The lawn mower 276 (Figures 16, 17 and 18) represents, in the sectional vehicle assembly of Figure 16, a wheeled or mobile front unit, and is of conventional construction and design, including wheels 284, cutting mechanism in the form of a reel 286, a roller 287 and a handle 288 of the single-member type. As is typical of mowers of this type, the handle 288 is swingable relative to the wheel means between two positions, in one of which (Figure 16) the mower rolls on its wheels and roller and pushing of the mower causes the wheels 284 to rotate the reel 286 and in the other of which positions (reversed or inverted as respects Figure 16) the mower rolls on its wheels alone, the roller 287 now being uppermost as is well known and pushing of the mower therefore reverses the direction of rotation of the wheels 284 and they overrun the reel; hence, the reel is idle, or the mower "free wheels." In each position, the handle inclines upwardly and rearwardly at an angle of approximately 45°, it being understood that, in order to obtain the same direction of travel in both instances, whether the mower is cutting or free wheeling, not only must the handle be swung forwardly and upwardly from the position of Figure 16 but the entire mower must be reversed fore and aft. Therefore, in both handle positions, the handle will incline as above stated; and, when the mower is connected to the power unit via the bracket 282, the handle is proximate to the now installed seat 114 to enable steering of the vehicle, which, although not characteristic of the vehicle 30—214 (motor car) is common to the vehicles 30—276, 30—278 and 30—280. The advantage of the reversibility of either of the mowers 276 or 278 is that in one phase the vehicle is useful for mowing and in the other phase "free wheels" as for travelling or for use of the inverted or reversed mower as a general utility unit on which various attachments may be mounted as on the now uppermost roller 287, such as seeders, fertilizers, etc., many examples of which are per se known. The bracket means 282 exploits this advantage to the utmost, whether the propelled or front unit has the single handle 288 of the mower 276 or the Y-shaped double-barred handle or frame part 290—292 of the mower 278. The bracket is also adapted to the wide spread double-barred handle or frame 294—296 of the unit 280. It should be noted that the mowers 276 and 278 are identical in the conventional sense of the wheel-to-reel relationship as well as respects reversibility or inversion. Normally, reversibility of the unit 280 will not be required; nevertheless, the bracket 282 will accommodate such reversibility. In the interests of maintaining the individual identity of the units 276, 278 and 280, even though they have much in common, each will be separately described before proceeding with the description of the bracket or connector 282. The unit 276 has already been covered.

The unit or mower 278 has wheels 298, a reel 300 and the handle members 290 and 292 already described. Like the mower 276, the mower mows in one direction and free wheels in the other. The utility unit 280, in addition to the handle members 294 and 296, includes an axle 302, wheels 304 journaled on the axle, and pintled mounting pads 306 (Figure 21) for removably carrying a receptacle 308 (Figure 22).

The bracket means 282 comprises a basic member 310 having a forward part 312 from which rigidly depends a hook element 314 having integral angularly related portions 316 and 318. When in use, the basic member 310 is inclined on the order of whichever handle it is used with, the forward part 312 is generally horizontal, and the hook portion 316 is vertical and the hook portion 318 is horizontal and projects forwardly. In connecting the units 30 and 276, 278 or 280, the hook element is received in the eye 158 in the reach plate 156, the hook portion 316 affording a pintle or upright pivot about which relative lateral swinging between the power and front units may be achieved so that the vehicle is steerable by a seated operator via the front unit handle. The horizontal hook portion 318 sustains the weight of the front end of the reach 150, since the mower, when in cutting position as distinguished from free wheeling position is stable. The member 310 has a plurality of apertures 320 and is removably mounted on any of the handles or frame parts by means of fasteners including plain bolts 322 or U-bolts 324, depending upon the style of handle or frame, together with additional fastening components including apertured cross straps 326, one or more cross bars 328, additional U-bolts 330, apertured U-bolt clips 332, or a duplicate basic member 310a.

For example, in Figure 16, the single basic member 310 is secured to the handle 288 by cross straps 326 and bolts 322, the bolts 322 straddling the single handle. In order to effect a vehicle in which the mower 276 free wheels, the mower is reversed and the bracket structure is removed and assembled at the other side of the handle. The necessity for removing and reversing the bracket member 310 is avoided in Figures 17 and 18. In the former, a bracket member 310 and a duplicate 310a, but reversed, are placed back to back and secured to one side of the handle 288 by the bolts 322 and straps 326, with both members 310 and 310a at the same side of the handle. The front parts 312 and 312a and hooks 314 and 314a are each available through the spread irons 334 at the lower end of the handle 288. In Figure 18, the members 310 and 310a are mounted at opposite sides of the handle 288, with the handle between them, and the cross straps 326 are not used, the bolts 322 being received by corresponding apertures in the members. Since, as in Figure 17, the members 310 and 310a are mounted at or parallel to the rear under and upper front sides, respectively, of the handle, complete reversibility may be attained.

In Figures 19 and 20 a single member 310 is mounted on the frame or handle bars 290 and 292 by a pair of bolts 322 and a cross strap 326 where the bars 290 and 292 are close together and by a cross bar 328, U-bolts 324 and U-bolts 330 and clips 332 where the bars 290 and 292 are far apart. Thus the same bracket member is adapted to different types of mowers. If desired, two members 310 and 310a could be used in back-to-back relation after the fashion of Figure 17, for example. The mounting of the member 310 on the frame or handle 294–296 of the unit 280 (Figures 21 and 22) uses two cross bars 328 and no bolts 322 or straps 326, but the use of the larger U-bolts 330 and clips 332 is doubled. From the foregoing, the availability of combinations other than those disclosed will be appreciated. The receptacle 308, supported at 306, receives additional support from at least one of the cross bars 328.

Connection of the power unit 30 to any front unit having bracket means 282 is simply accomplished, following generally the elevation of the reach and front unit frame part (288, 290 and 292, or 294—296) so that the two are in effect buckled upwardly. In this up position of the front unit frame (compare Figure 15), connection of the hook 314 in the reach eye 158 is facilitated, since the forwardly projecting portion 318 of the hook points thence more nearly downwardly, and once it enters the eye, the now interconnected frame parts can be moved to respective down positions. Downward buckling beyond the normal operating position (see Figure 16) is prevented by the vertical load-sustaining engagement between the reach plate as confined between the bottom of the member portion 312 and the now horizontal hook portion 318. The connection 282—156 is, like the motor car and power unit connection 232—234—156, sufficiently articulate to include a transverse pivot about which the unit frame parts may be lifted to effect separation thereof, it being understood that as the unit frame parts are so lifted or buckled upwardly, the units move toward each other. Conversely, when connection is effected, the units roll apart within the limits established by frame parts in tension. In the case of the motor car, the fore-and-aft lock is accomplished by receipt of the uprights 118 and 120 in the seat-mounted cross bar 240.

As previously described, each mower, in its cutting position, is stable because of its roller, but is unstable in its free wheeling position, since the roller no longer contacts the ground. Hence the free-wheeling mowers are like the utility unit 280, which is inherently unstable because it has no roller or additional ground support (disregarding legs or the like on which it may rest when standing alone). Therefore, the under and upper surfaces of the bracket portion 312 and reach plate 156, respectively, are of sufficiently large area, at least rearwardly of the hook 314, to afford ample load-bearing faces cooperative to prevent downward buckling at the joint or connections 156—282 beyond a position comparable to Figure 16.

The various phases of the inventive design are based on much in common. The interconnection between the unit 30 and any of the units 214, 276, 278 or 280 follow the same pattern as respects the reach-to-bracket or reach-to-connector 232—234 relationship. In the mower and utility vehicles, the rider is sustained by the seat and the spring or cushion means 118—128 and 120—130 and in the motor car version the seat 114 is not used but the same resilient support is obtained. The controller 176 is used in all versions of the vehicle.

Various other features, not categorically enumerated, will occur to those versed in the art, as will modifications and alterations in the basic structure disclosed, all within the spirit and scope of the invention.

What is claimed is:

1. A vehicle comprising: front and rear selectively interconnectible and separable fore-and-aft spaced apart units, each having its own ground-engaging means; said rear unit including a forwardly extending frame part having a front end portion rigid thereon and proximate to the front unit; said front unit including a rearwardly extending frame part having a rigid support portion rearwardly beyond and overlying said front end portion of said rear frame part, said front frame part being vertically swingable bodily upwardly and forwardly about its own ground-engaging means and relative to the rear unit between an up position spaced above the rear frame part and a down position proximate to said rear frame part; a front connection element rigid on the front frame part ahead of said support portion and a rear connection element rigid on the front end portion of the rear frame part receivable by said front connection element when the front frame part is in its up position, said elements being constructed to afford a hook and eye device interengaging to provide an articulate joint enabling swinging of the front frame part to its down position and said front connection element having a portion beneath and cooperating to sustain the front end portion of the rear frame part on the front frame part, and sustaining means on the support portion of the front frame part and engaging the rear unit from above and immediately rearwardly of the articulate joint to prevent downward buckling of the frame parts about said articulate joint, and said hook and eye device of the articulate joint constituting a pivot on an upright axis to enable steering of the front unit to control the direction of travel of the vehicle.

2. A sectional vehicle, comprising: a rear power unit having wheel means, a power plant and an operator's seat and being individually unstable about said wheel means so as to be rockable about said wheel means between up and down positions, said unit having a reach means extending forwardly from said wheels, seat and power plant to a front end provided with a vertically opening eye; a front unit positionable ahead of said front end and having its own wheel means and a supporting part extending rearwardly and proximate to the seat as a steering member, said front unit being rockable upwardly and downwardly about its wheel means and said support means being rigidly arranged as a rearward cantilever; and means for detachably interconnecting the units for mutual stability and for steering of the front unit generally about the axis of the eye, including a hook element rigid on and depending from the front unit supporting part and receivable downwardly through said eye as the two units are rocked downwardly, said hook element having a forwardly directed part engaging under a front end portion of the reach means ahead of said eye to limit downward rocking of the units to a position of mutual stability.

3. A sectional vehicle of the class described, comprising: a rear mobile unit adapted to advance over the ground and including a pair of laterally spaced apart coaxial rear wheels, fore-and-aft reach means having a rear end portion mounted on and between the wheels and extending forwardly at a level below that of the axis of the wheels and having a terminal front end, a power plant at said rear end portion and nested between and drivingly connected to the wheels, a relatively wide platform on the reach means ahead of the wheels and power plant and capable of supporting a standing operator, an operator's seat mounted on the rear unit in overlying relation to the power plant and rearwardly of the platform and at a height enabling seating of an operator thereon with his feet on said platform, and said terminal front end of the reach means being located well ahead of the platform and including a connecting element; a front mobile unit disposed ahead of and adapted to be pushed by the rear unit and comprising a wheeled lawn mower of conventional construction having a rigid handle inclining upwardly and rearwardly from a front lower portion immediately forwardly of and adjacent to the connecting element on the reach means to a rear upper portion conveniently proximate to the operator's seat so that an operator seated on said seat may grasp said rear upper portion; and a connecting element on the handle at its front lower portion and engaged with the connecting element on the reach means, said connecting elements being constructed to provide a vertical pivot about which the mower may be turned laterally in either direction by the seated operator so as to steer the vehicle.

4. A sectional vehicle of the class described, comprising: a rear mobile unit adapted to advance over the ground and including a pair of laterally spaced apart coaxial rear wheels, fore-and-aft reach means having a rear end portion mounted on and between the wheels and extending forwardly at a relatively low level and having a terminal front end, a power plant at said rear end portion and nested between and drivingly connected to the wheels, a relatively wide platform on the reach means ahead of the wheels and power plant and capable of supporting a standing operator, an operator's seat mounted on the rear unit in overlying relation to the power plant and rearwardly of the platform and at a height enabling seating of an operator thereon with his feet on said platform, and said terminal front end of the reach means being located well ahead of the platform and including a connecting element; a front mobile unit disposed ahead of and adapted to be pushed by the rear unit and having a rigid handle extending upwardly and rearwardly from a front lower portion immediately forwardly of and adjacent to the connecting element on the reach means to a rear upper portion conveniently proximate to the operator's seat so that an operator on said rear unit may grasp said rear upper portion; and a connecting element on the handle at its front lower portion and engaged with the connecting element on the reach means, said connecting elements being constructed to provide a vertical pivot about which the mower may be turned laterally in either direction by such operator so as to steer the vehicle.

5. The invention defined in claim 4, in which: the handle is a single relatively narrow member; the connecting element on the handle is a bracket including means detachably securing same to said handle; the connecting element on the reach means includes an eye; and the connecting element on the handle further includes a hook received in the eye for sustaining the front end of the reach means on the handle.

6. A sectional vehicle, comprising: a rear power unit having wheel means, a power plant driving the wheel means, and a reach means extending ahead of the power plant and wheel means and having a front end rigid thereon and provided with a vertically opening eye, said reach means being vertically swingable about its wheel means; a front unit comprising a conventional lawn mower disposed ahead of the front end of the reach means and having wheel means and a ground-engaging roller closely rearwardly of said last-named wheel means and a handle inclined upwardly and rearwardly from said last-named wheel means and generally overlying the reach means, said front unit being rockable about its wheel means upwardly and forwardly from and downwardly and rearwardly to a stable position supported by its said wheel means and its said roller and also being forcibly rockable rearwardly and downwardly about said roller by force applied to the handle; and means for detachably interconnecting the handle and reach means for mutual support and stability of each other, including a bracket rigidly mounted on and depending from the handle rearwardly of and at a level above the roller and having rigidly thereon a hook element provided with a depending portion adapted to pass through the reach means eye in a downward direction as the front unit is rocked downwardly and rearwardly to its stable position, said hook element further including a fore-and-aft directed portion engaging under the reach means front end, and means engageable between the units to limit downward rocking of the front unit about its roller when said units are interconnected and said last-named means being also operative to limit downward rocking of the reach means about the rear unit wheel means when said units are interconnected.

7. The invention defined in claim 6, in which: said last named means includes a portion on the front end of the reach means affording a generally horizontal load-supporting surface rearwardly of the eye; and the bracket includes means rearwardly of the hook element and sustained by and riding on said surface.

8. The invention defined in claim 6, including: means detachably mounting the bracket on the handle and including a transverse bar for supporting auxiliaries on said front unit.

References Cited in the file of this patent

UNITED STATES PATENTS

| 573,334 | Kulage | Dec. 15, 1896 |
| 584,127 | Draullette et al. | June 8, 1897 |
| 880,823 | Redfield | Mar. 3, 1908 |
| 950,061 | Speir | Feb. 22, 1910 |
| 1,213,260 | Rendle | Jan. 23, 1917 |
| 1,240,782 | Savidge | Sept. 18, 1917 |
| 1,315,977 | McLain | Sept. 16, 1919 |
| 1,557,902 | Thompson | Oct. 20, 1925 |
| 1,919,930 | Cash | July 25, 1933 |
| 2,212,517 | Gamradt et al. | Aug. 27, 1940 |
| 2,224,411 | Smith | Dec. 10, 1940 |
| 2,354,576 | Clark | July 25, 1944 |
| 2,511,692 | Brown | June 13, 1950 |
| 2,625,230 | Burkhardt | Jan. 13, 1953 |
| 2,660,447 | Bear | Nov. 24, 1953 |
| 2,678,462 | Lison et al. | May 18, 1954 |
| 2,765,861 | Ekas | Oct. 9, 1956 |

FOREIGN PATENTS

| 13,423 | Great Britain | A.D. 1914 |